United States Patent [19]
Toyoda et al.

[11] Patent Number: 4,904,911
[45] Date of Patent: Feb. 27, 1990

[54] SYSTEM FOR CONTROLLING ROBOT

[75] Inventors: Kenichi Toyoda, Hino; Nobutoshi Torii, Hachioji; Ryo Nihei, Musashino; Akihiro Terada, Hino, all of Japan

[73] Assignee: Fanuc Ltd., Yamanashi, Japan

[21] Appl. No.: 283,991

[22] PCT Filed: Feb. 24, 1988

[86] PCT No.: PCT/JP88/00193
§ 371 Date: Nov. 15, 1988
§ 102(e) Date: Nov. 15, 1988

[87] PCT Pub. No.: WO88/07442
PCT Pub. Date: Oct. 6, 1988

[30] Foreign Application Priority Data
Mar. 30, 1987 [JP] Japan .................. 62-74248

[51] Int. Cl.⁴ .............................. B25J 19/06
[52] U.S. Cl. .............. 318/568.24; 318/434; 318/567; 318/569; 318/571; 364/513; 901/9
[58] Field of Search ............... 318/432, 434, 560-574, 318/594, 628, 629, 630, 632; 364/513; 901/3, 9, 12, 13, 15, 16, 18, 19, 20, 23, 24

[56] References Cited
U.S. PATENT DOCUMENTS

| | | | |
|---|---|---|---|
| 4,182,979 | 1/1980 | Douglas et al. | 318/434 |
| 4,346,444 | 8/1982 | Schneider et al. | 318/571 X |
| 4,353,018 | 10/1982 | Kohzai et al. | 318/571 |
| 4,587,469 | 5/1986 | Ikebe et al. | 318/432 |
| 4,659,976 | 4/1987 | Johanson | 318/432 X |
| 4,712,052 | 12/1987 | Omae et al. | 318/625 |
| 4,785,221 | 11/1988 | Neko | 318/567 |
| 4,807,153 | 2/1989 | Onaga et al. | 901/9 |
| 4,841,211 | 6/1989 | Neko | 318/569 |

FOREIGN PATENT DOCUMENTS

| | | |
|---|---|---|
| 57-078391 | 5/1982 | Japan . |
| 61-026484 | 2/1986 | Japan . |
| 61-070612 | 4/1986 | Japan . |
| 61-236487 | 10/1986 | Japan . |

Primary Examiner—William M. Shoop, Jr.
Assistant Examiner—Paul Ip
Attorney, Agent, or Firm—Armstrong, Nikaido, Marmelstein, Kubovcik & Murray

[57] ABSTRACT

A system for controlling a robot includes a control portion (7) for supplying a control signal to and receiving a control signal from a servo unit (6) for carrying out a signal supply and a signal feedback to an electric motor (5) for driving a shaft executing a Z-axis linear motion, and threshold value supply portion (8) for supplying a threshold value to the control portion. Based on a comparison between a motor torque instruction value and a threshold value supplied from the threshold value supplying portion, an alarm is delivered and the process subsequently proceeds to a step of dealing with an abnormal condition when said motor torque instruction value becomes greater than a predetermined threshold value.

1 Claim, 6 Drawing Sheets

SYSTEM FOR CONTROLLING ROBOT

TECHNICAL FIELD

The present invention relates to a system for controlling a robot in which a control is carried out based on a detection of a force along the Z-axis of the robot. The device according to the present invention may be used in an industrial robot for carrying out, for example, an assembling job.

BACKGROUND ART

In general, when an industrial robot having a linked structure composed of a rotatable arm portion, a vertically movable shaft portion, and related devices is used to fix a worked article (workpiece) to an object article, it is possible that a related motion of a workpiece will deviate from a normal condition, for some reason, and an abnormal situation such as a collision of the workpiece with the object article occurs. Such an abnormality causes a failure of the robot and hinders the progress of the robot operation, and accordingly, effective measures are sought to minimize such problems and thus facilitate a smooth progress of the robot operation, although such appropriate measures have not yet been obtained.

DISCLOSURE OF THE INVENTION

It is an object of the present invention to provide an improved system for controlling a robot in which a control is carried out based on a detection of a force along the Z-axis of the robot.

According to the present invention, there is provided a system for controlling a robot, characterized in that the system includes an electric motor for driving a shaft executing a Z-axis linear motion of the robot, a servo unit for carrying out a signal supply and a signal feedback to the electric motor, a control portion for supplying a control signal to and receiving a control signal from the stated servo unit, and threshold value supply portion for supplying a threshold value to the above control portion, a comparison between a motor torque instruction value and a threshold value supplied from the threshold value supply portion being carried out in the control portion, and an alarm being delivered and the process subsequently proceeding to a step of dealing with an abnormal condition, when the motor torque instruction value becomes greater than a predetermined threshold value, whereby a control is carried out based on a detection of a force along the Z-axis of the robot.

BEST MODE FOR CARRYING OUT THE INVENTION

Figure 1:
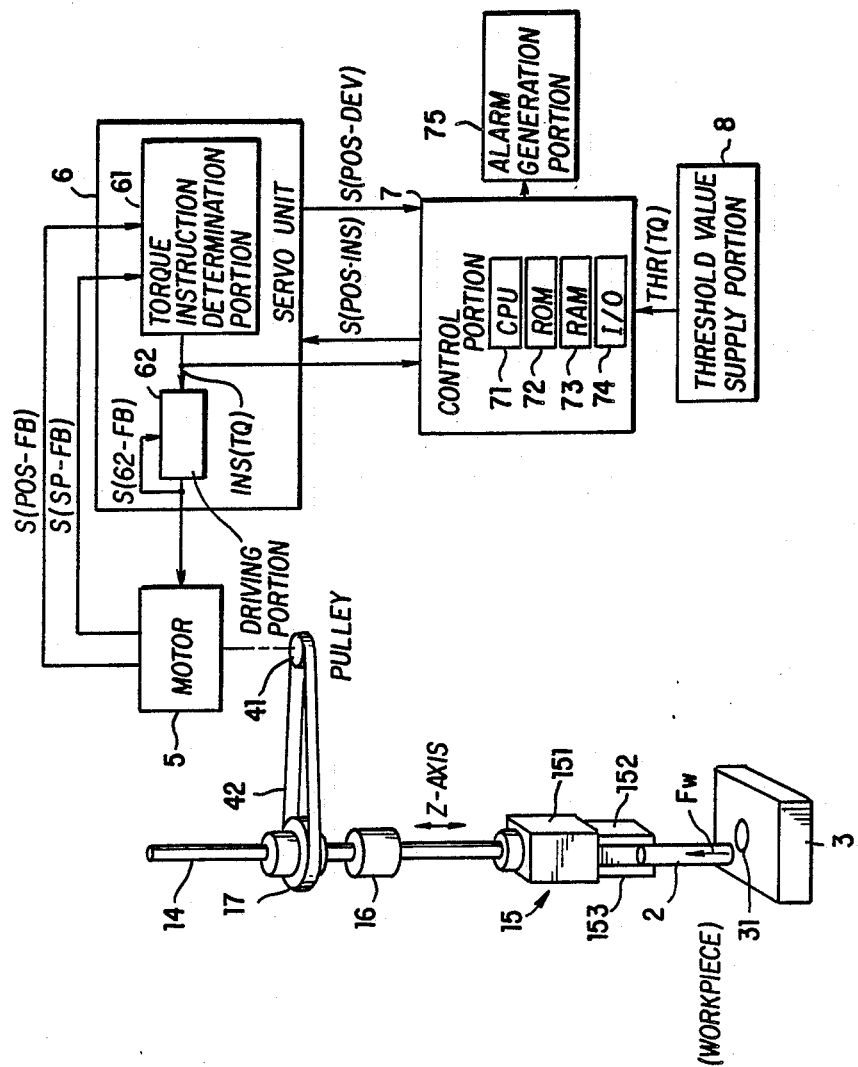
FIG. 1 shows a schematic diagram of overall structure of a system for controlling a robot as an embodiment of the present invention.
Figure 2:
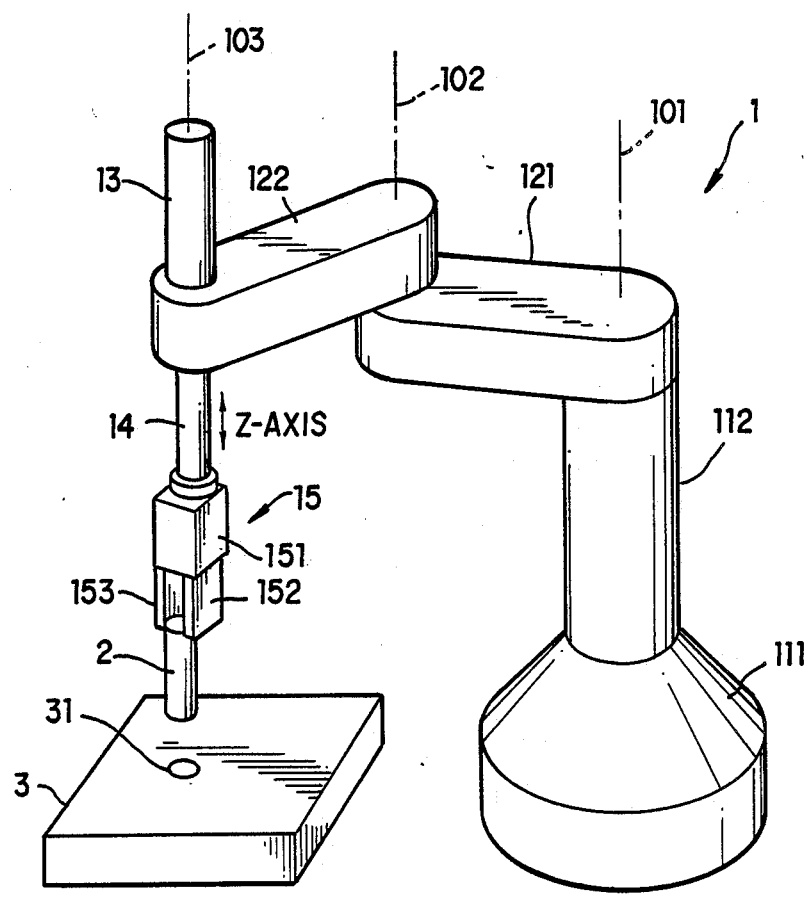
FIG. 2 shows a structure of a robot to which the device of FIG. 1 is applied.
Figure 3:
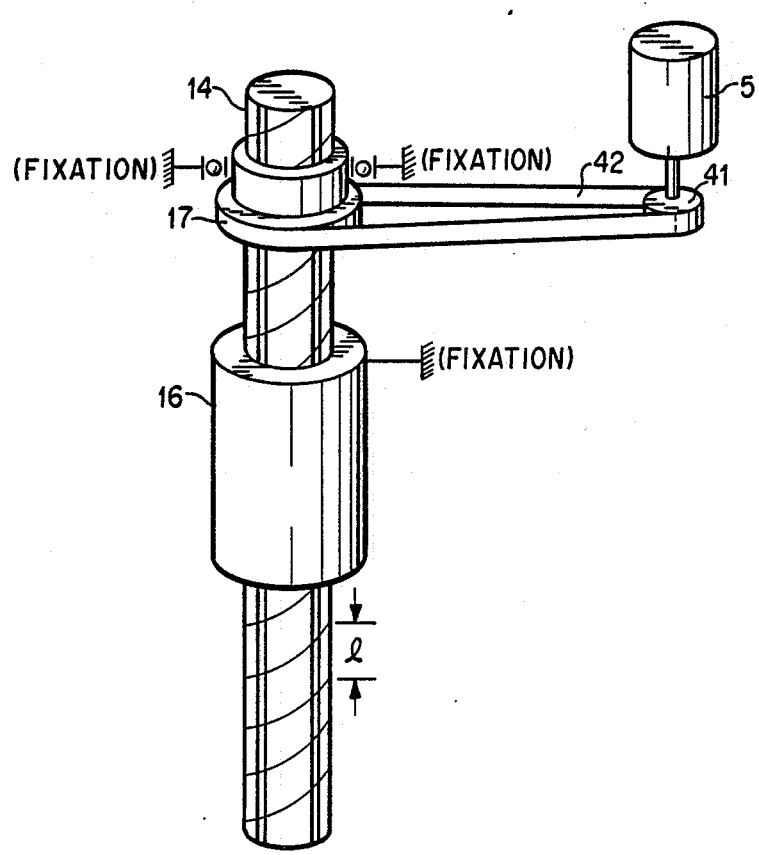
FIG. 3 illustrates a summarized structure of an assembly including a pulley, a ball-and screw nut and a ball-and spline nut, in the device shown in FIG. 1.
Figure 4:
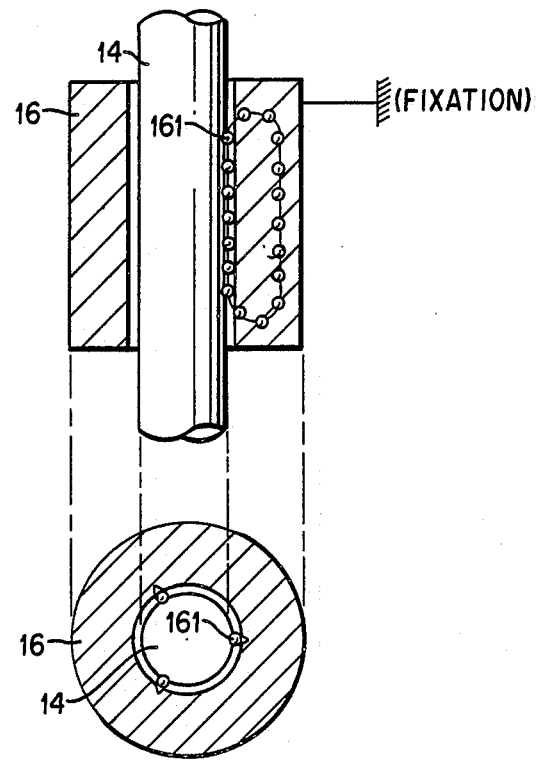
FIG. 4 summarizes a structure of a ball-and spline nut included in the structure shown in FIG. 3.

A schematic diagram of a system for controlling a robot according to an embodiment of the present invention is shown in FIG. 1, and an industrial robot for an assembling job to which the system of FIG. 1 is applied is shown in FIG. 2.

The third axis mechanism i.e., the Z-axis of the robot 1 is shown in the left portion of FIG. 1. At the tip of a shaft 14, as the third or Z-axis, a band head 15 consisting of a band base portion 151 and grip fingers 152 and 153 is mounted. The grip fingers grip a workpiece 2 and insert the workpiece into a hole 31 in an object article.

The shaft 14 is driven by a motor 5 through a transmission system including a pulley 41, a pulley belt, and a ball-and-screw nut 17, providing a vertical movement in linear motion.

A rotary motion is transmitted from the pulley transmission system to the ball-and-screw nut 17, and consequently, a rotary driving force is applied to the shaft 14, but due to an action of a ball-and-spline nut located beneath the ball-and-screw nut 17, the motion of the shaft 14, which is apt to rotate, becomes an up-and-down motion of the shaft 14 in a linear movement. In the ball-and-spline nut 16, a line of balls 161 lie between the internal surface of the nut and the shaft 14, and by the circulation of such a line of balls, the motion of the shaft 14, which is apt to rotate, appears as a vertical motion. (With regard to the use of a power transmission mechanism equipped with a ball-and-spline nut to drive the arm shaft of an industrial robot, reference can be made to, for example, Japanese Patent Application No. 61-222186, filed by the present applicant.)

In the robot 1 shown in FIG. 1, a column 112 stands on a base stand 111, and the column 112 supports the first arm 121 which may rotate around the first axis 101. The top end portion of the first arm 121 is incorporated with the second arm 122 which may rotate around the second axis 102, and the top end portion of the second arm 122 is incorporated with the shaft 14 which is accommodated in a shaft-receiving cylindrical enclosure 13 and is vertically movable along the third axis 103. The first arm 121, the second arm 122, and the shaft 14 are driven by a motor (not shown).

In the robot 1, while the normal operation is carried out, the workpiece 2 held in the hand 15 is properly inserted in the hole 31 of the object article 3, but when an abnormal condition occurs such that the position of the workpiece 2 does not match the position of hole 31 for some reason, so that the workpiece 2 strikes against the surface of the object article 3, and in particular, if an appropriate countermeasure is not provided, due to the continuous action of the drive force from the motor, the workpiece 2 is pressed strongly against the object article 3. This may cause damage to the object article 3, the workpiece 2, the hand 15 and/or other portions of the robot 1, and further, may cause an undesirable emergency stoppage of the robot 1. The device of FIG. 1 has an advantage of eliminating such an undesirable problem.

The action principle of the device shown in FIG. 1 will be described hereafter. When the shaft 14 comes down, and if the workpiece 2 does not coincide with the predetermined position of the hole 31 of the object article 3, but instead collides against the surface of the object article 3, the reaction force Fω from the object article 3 acts on the workpiece 2 as the Z-axis force.

When a pitch (lead) of a thread on the shift 14 is considered as 1mm/rev, a reduction ratio of the pulley timing belt as 1/i, and an efficiency of the transmission system from the pulley 41 to the ball-and screw nut 17 as η, the following relative expression is effected for the torque Tm of the motor:

$$Tm = Fw \times \frac{l}{2\pi} \times \frac{1}{i} \times \frac{1}{\eta}$$

Since each of 1/2, 1/i, and 1/η above is a constant, the formula (1) shows that the motor torque Tm is in proportion to the reaction force Fw applied to the workpiece.

Accordingly, in the device of FIG. 1, the reaction force (Fw) acting on the workpiece can be monitored by monitoring the motor torque (Tm) instruction.

The motor 5 is driven by the output from the drive portion 62 of servo unit 6. Feedback of an output current from the drive portion 62 is carried out by a current feedback signal S(62-FB) to the drive portion 62. Feedback of a position feedback signal S(POS-FB) and a position feedback signal S(SP-FB) from the motor 5 is carried out to the torque instruction determination portion 61 of the servo unit 6.

The output of the torque instruction determination portion 61 is delivered to the drive portion 62 as a torque instruction INS(TQ), which is also transferred to the control portion 7. The control portion 7 includes a CPU 71, ROM 72, RAM 73, and an input/output device 74. A position deviation signal S(POS-DEV) is delivered from the servo unit 6 to the control portion 7, and a position instruction signal S(POS-INC) is delivered from the control portion 7 to the servo unit 6.

A torque threshold value THR(TQ) is supplied from the threshold value supply portion 8 to the control portion 7. This supply is executed when an operator stores a threshold value prepared as a program to the RAM 73 of the control portion 7, using a key board or other appropriate means. A comparison between a torque instruction INS(TQ) and a torque threshold value THR(TQ) is carried out in the control portion 7.

Figure 5:
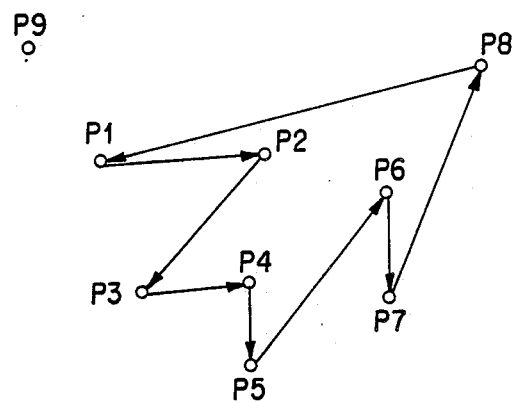
FIG. 5 shows an example of a movement of the top end of robot.

During normal operation, the motor 5 is driven according to the operation of the servo unit 6, but in a defective state wherein the workpiece 2 operated by the shaft 14 does not coincide with the position of the hole 31 of the object article 3 and a failure to insert the workpiece 2 into the hole 31 occurs, the rotation speed of the motor is decreased and a phenomenon of a non-following of the position occurs in the control of motor operation. Based on this, the torque instruction INS(TQ) value increases. This increase proceeds and when the result of a comparison between a torque instruction INS(TQ) value and a threshold value THR(TQ) in the control portion 7 indicates that the torque instruction value has become greater than a predetermined threshold value, the defective control state i.e., a failure to insert the workpiece, is determined, and based on this determination, an alarm is delivered at the alarm generation portion 75, and the process subsequently proceeds to a step of dealing with an abnormal condition. As described above, in the device of FIG. 1, a threshold value THR(TQ) is supplied to the control portion 7, a comparison between a motor torque instruction value and a threshold value is carried out in the control portion 7, and in the servo unit 6, the torque instruction determination and the motor drive signal delivery are carried out based on the signal received from the delivered to the control portion 7 and the motor 5, and consequently, the shaft motion as the Z-axis linear motion in the robot is carried out by being deriven by the motor 5. When the motor torque instruction value INS(TQ) becomes greater than the predetermined threshold value THR(TQ), an alarm is delivered at the alarm generation portion 75, and the process consequently proceeds to a step of dealing with an abnormal condition. The torque threshold values THR(TQ) are set in the robot operation programs, and when the robot performs a plurality of operations, it may select an individual threshold value corresponding to respective operations. FIG. 5 is an example showing a movement of the top end of the robot. In FIG. 5, each of P1 to P8 indicate a teaching point, P9 is a waiting position of the top end of robot, and each arrow indicate a locus of the top end of robot.

An example of a program for a robot operation shown in FIG. 5 is shown in the chart below.

| ADDRESS | INSTRUCTION |
|---|---|
| 1 | Move to P1 |
| 2 | Move to P2 |
| 3 | Move to P3 |
| 4 | Move to P4 |
| 5 | Move to P5 |
| 6 | If determination of INS(TQ) > THR(TQ) is YES, jump to address 12, and if NO, proceed to next address. |
| 7 | Move to P6 |
| 8 | Move to P7 |
| 9 | If determination of INS(TQ) > THR(TQ) is YES, jump to address 12, and if NO, proceed to next address. |
| 10 | Move to P8 |
| 11 | Jump to address 1 |
| 12 | Move to P9 |
| 13 | Deliver an alarm signal. |
| 14 | Wait |

Figure 6:
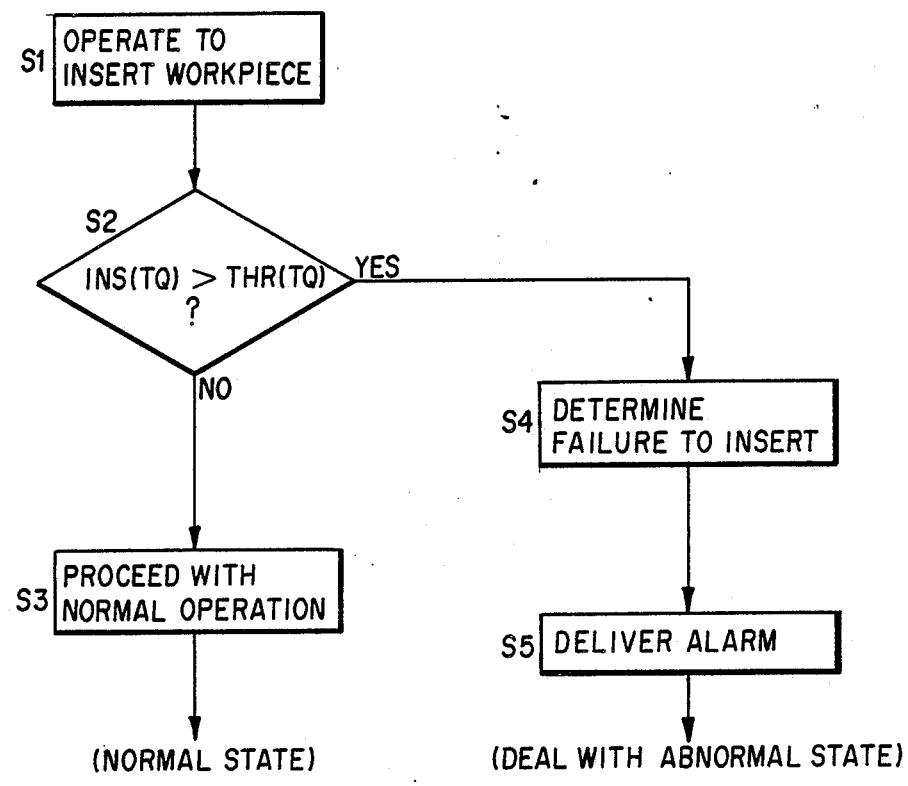
FIG. 6 is a flow chart showing an example of the operation of device shown in FIG. 1.

In the above chart, the torque instruction value INS(TQ) may be converted to FW (kg) using the previously described formula (1). But in this case, the torque threshold value THR(TQ) must be a kg value in the FIG. 6 is a flow chart showing an example of the operation of the device shown in FIG. 1. In step S1, an operation of inserting the workpiece 2 is carried out by the motion of shaft 14, and in step S2, it is determined whether the torque instruction value INS(TQ) exceeds the threshold value THR(TQ). If the torque instruction value INS(TQ) is less than the threshold value THR(TQ), the process goes to step S3 and the normal operation proceeds, but if it is greater than the threshold value THR(TQ), the process goes to step S4 where a "failure to insert the workpiece" is determined, and in step S5, an alarm is delivered at the alarm generation portion 75, and subsequently, an abnormal condition is dealt with.

Figure 7:
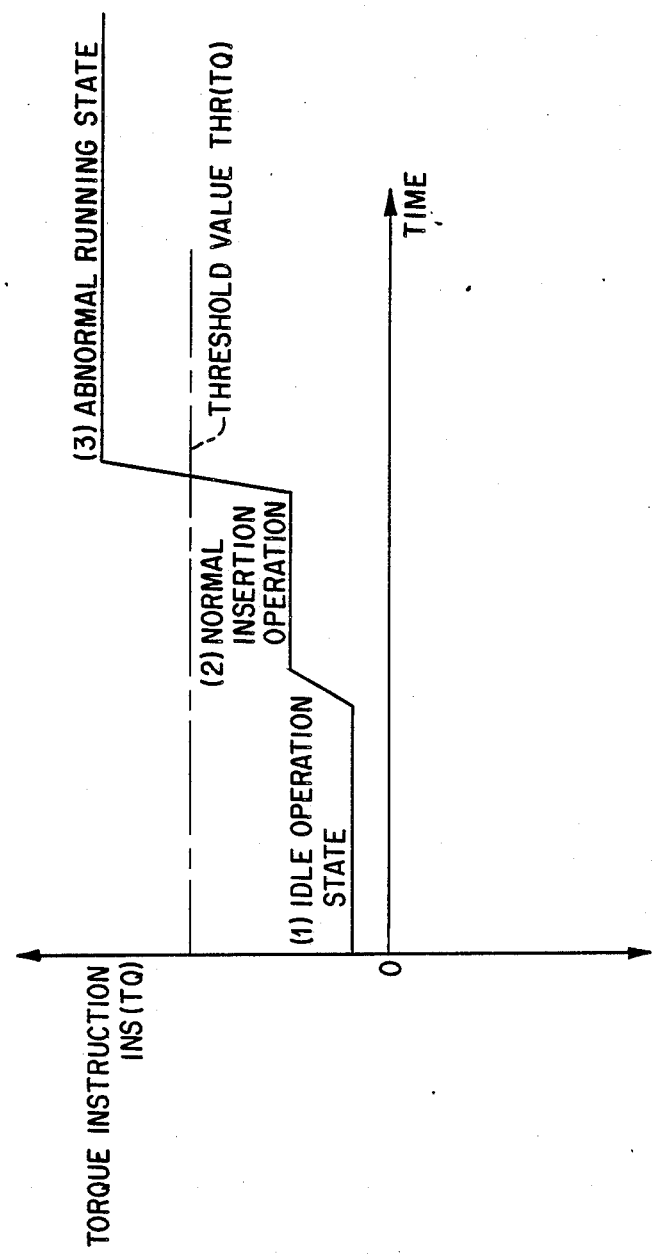
FIG. 7 is a characteristic diagram showing an operation characteristics of the device of FIG. 1.

A characteristic diagram for indicating the characteristic of time vs. torque instruction is shown in FIG. 7, to describe the motion of the device of FIG. 1. In the idle operation state (1), the torque instruction value INS(TQ) is at the lower level, and in a normal insertion operation (2), the torque instruction value INS(TQ) moves up to a level higher than (1) but still does not reach the threshold value THR(TQ). Then, if the torque instruction value INS(TQ) sharply increases to become an abnormal running state (3), the torque instruction value INS(TQ) exceeds the predetermined threshold value THR(TQ). Based on the detection of the abnormal running state (3), a "deliver alarm" and "dealing with an abnormal state" are carried out.

We claim:

1. A system controlling a robot, characterized in that said system comprises:
    an electric motor for driving a shaft executing a Z-axis linear motion of said robot;
    a servo unit for carrying out a signal supply and a signal feedback to said electric motor;
    a control portion for supplying a control signal to and receiving a control signal from said servo unit; and
    a threshold value supply portion for supplying a threshold value to said control portion;
    a comparison between a motor torque instruction value and a threshold value supplied from the threshold value supplying portion being carried out in said control portion;
    an alarm being delivered and the process subsequently proceeding to a step of dealing with an abnormal condition when said motor torque instruction value becomes greater than a predetermined threshold value;
    whereby, a control is carried out based on a detection of a force along the Z-axis of said robot.

* * * * *